Sept. 25, 1934.  F. GARIGLIANO ET AL  1,974,773
VEHICLE ANTISKID DEVICE
Filed April 4, 1933   4 Sheets-Sheet 1

Inventor
Frank Garigliano
Lerino Lattanzi

By Clarence A. O'Brien
Attorney

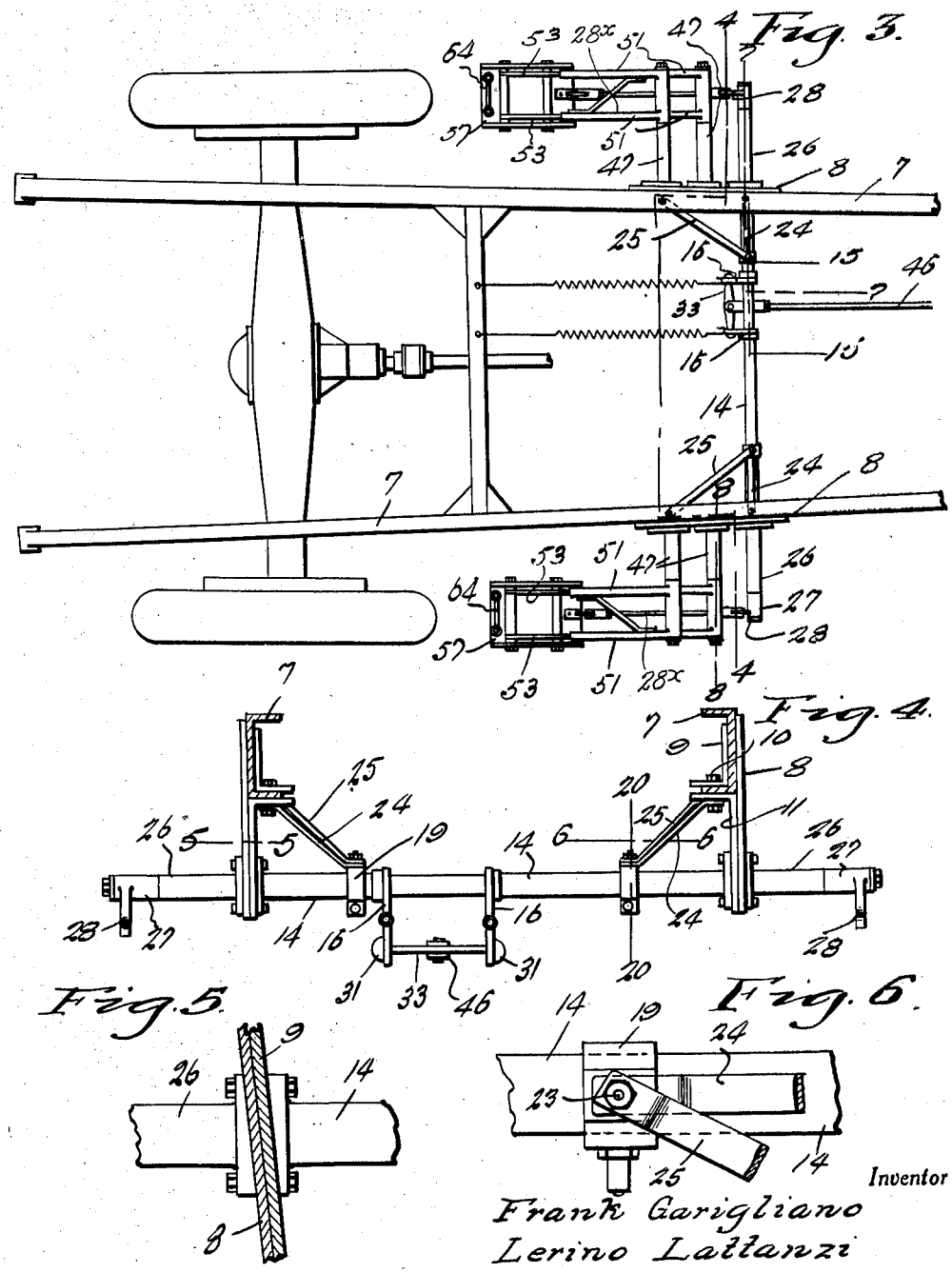

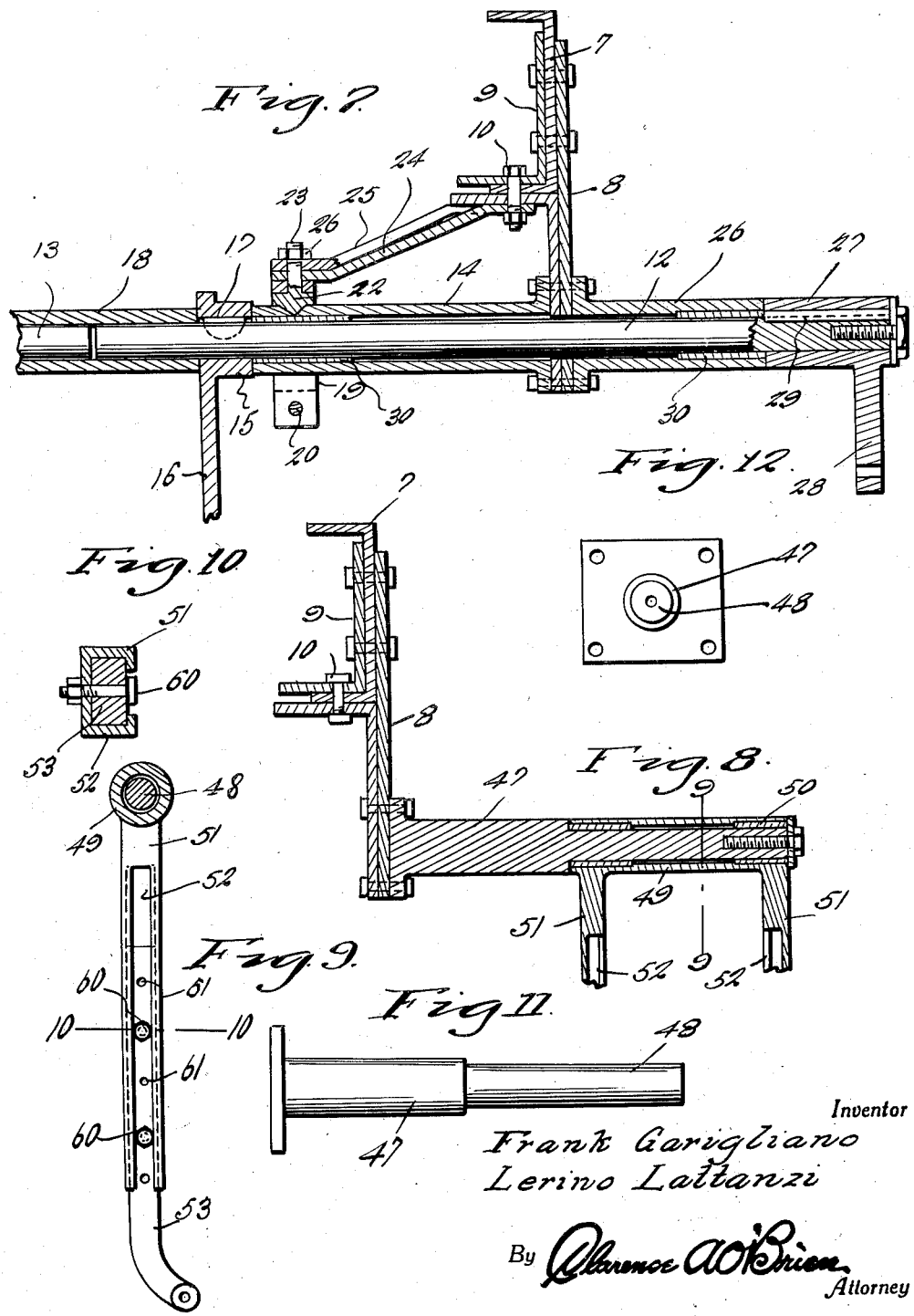

Sept. 25, 1934.    F. GARIGLIANO ET AL    1,974,773
VEHICLE ANTISKID DEVICE
Filed April 4, 1933    4 Sheets-Sheet 4
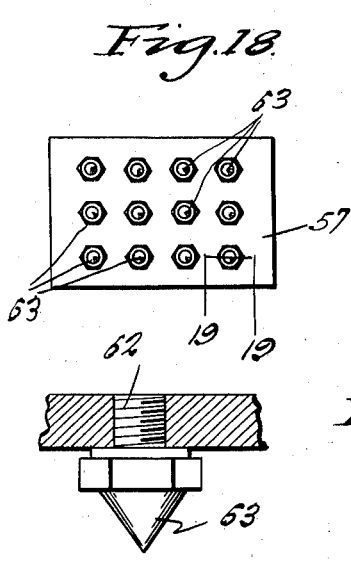
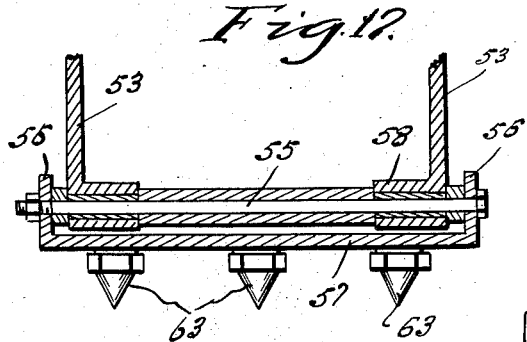
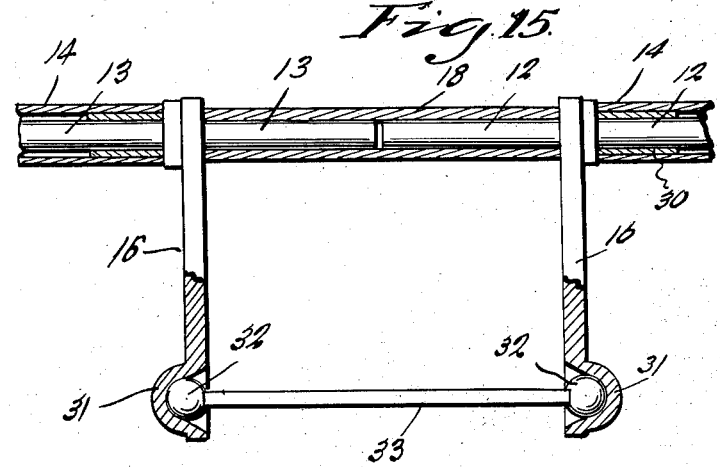
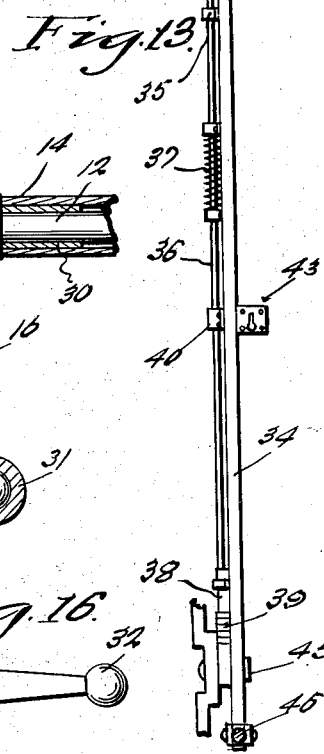
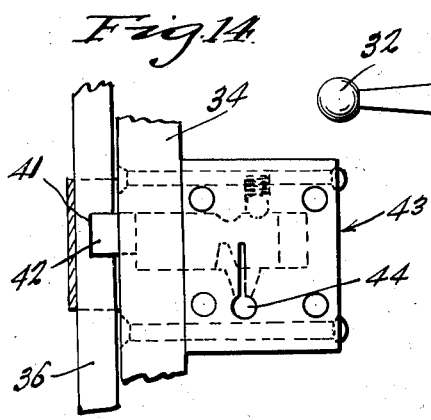
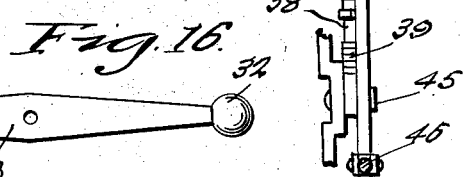
Inventor
Frank Garigliano
Lerino Lattanzi
By Clarence A. O'Brien
Attorney Patented Sept. 25, 1934

1,974,773

UNITED STATES PATENT OFFICE 1,974,773

VEHICLE ANTISKID DEVICE

Frank Garigliano and Lerino Lattanzi, Mount Kisco, N. Y.

Application April 4, 1933, Serial No. 664,456

3 Claims. (Cl. 188—5)

This invention appertains to new and useful improvements in attachments for vehicles and more particularly, motor vehicles, the same having as its principal object the provision of means operative to prevent skidding and also adapted to prevent theft of the vehicle.

An important object of the invention as an antiskid device is to provide means for treating the roadway in advance of the power wheels of a motor vehicle so as to provide an abraded or roughened surface upon which the wheels of the vehicle can find traction.

An important object of the device as an antitheft agency is to provide means whereby the device can be engaged with the ground and locked in this position to prevent removal of the vehicle by an unauthorized person.

Another important object of the invention is to provide a device which is simple in construction, easy to operate and durable in use.

These and various other important objects and advantages of the invention will become apparent to the reader of the following specification.

In the drawings:

Figure 3 represents a top plan view of an automobile chassis, showing the device in use, one unit on each side of the vehicle.

Figure 4 represents a sectional view taken substantially on line 4—4 of Figure 3.

Figure 5 represents a sectional view taken substantially on line 5—5 of Figure 4.

Figure 6 represents a fragmentary sectional view taken substantially on line 6—6 of Figure 4.

Figure 7 represents an enlarged fragmentary detailed sectional view taken substantially on line 7—7 of Figure 3.

Figure 8 represents a sectional view taken substantially on line 8—8 of Figure 3.

Figure 9 represents a sectional view taken substantially on line 9—9 of Figure 8, showing the adjustable construction of one of the legs.

Figure 10 represents a sectional view taken substantially on line 10—10 of Figure 9.

Figure 11 represents a side elevational view of the spindle shown in Figure 8.

Figure 12 represents an end elevational view of the spindle shown in Figure 11.

Figure 13 represents an elevational view of the hand lever and detent for controlling the mechanism.

Figure 14 represents a fragmentary elevational view partly in section, showing the locking means for the detent shown in Figure 13.

Figure 15 represents a sectional view taken substantially on line 15—15 of Figure 3.

Figure 16 represents a top plan view of the connector shown in Figure 15.

Figure 17 represents a sectional view taken substantially on line 17—17 of Figure 1.

Figure 18 represents a bottom plan view of the gripping plate.

Figure 19 represents an enlarged fragmentary detailed sectional view taken substantially on line 19—19 of Figure 18.

Figure 1:
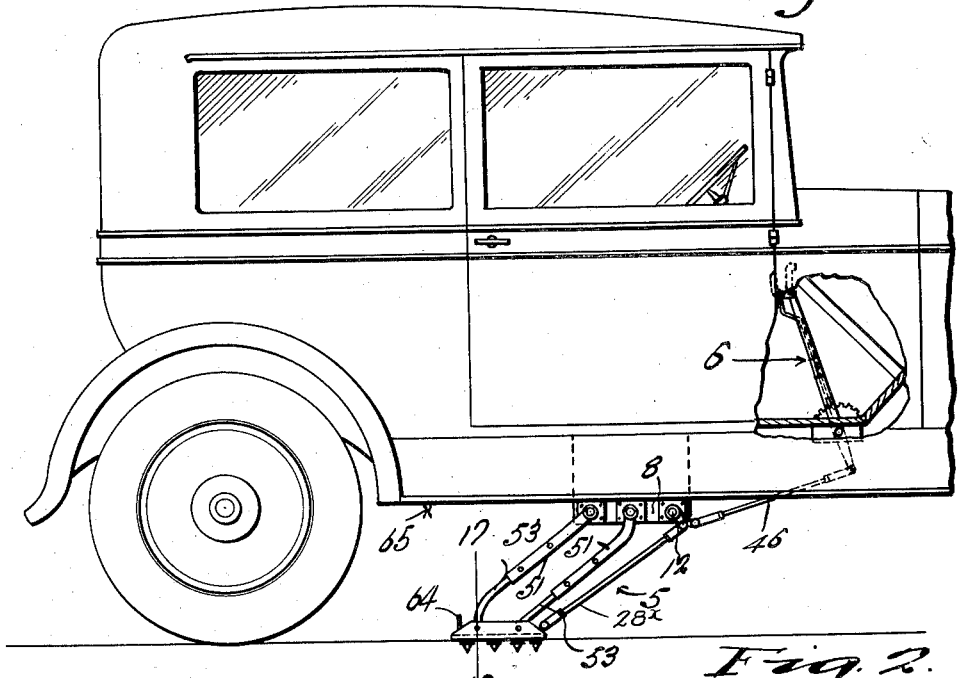
Figure 1 represents a side elevational view of the device installed on a vehicle.

Referring to the drawings, wherein like numerals designate like parts, it can be seen in Figure 1, that numeral 5 generally refers to the ground engaging or gripping device which is controlled by the operating means generally referred to by numeral 6 and which is located adjacent the driver's seat.

In carrying out the present invention, it can be seen that each side chassis bar 7 has an outside plate 8 and an inside angle bar 9. The angle bar 9 is bolted to the lower flange of the chassis bar 7 by bolts 10, which bolts also support the reinforcing plate carried by and passing through its upper flange which bears against the lower side of the chassis bar 7.

At the forward lower corner of the plates 8 and 11, at each side of the chassis frame, an opening is provided through which a shaft section extends, there being the shaft section 12 on one side of the vehicle and the shaft section 13 on the other side, as clearly shown in Figures 7 and 15.

Figures 20, 21:
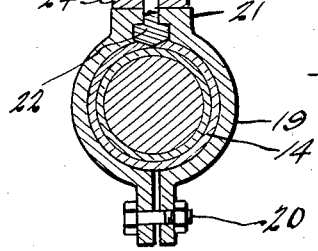
Figure 20 represents a sectional view taken substantially on line 20—20 of Figure 4.
Figure 21 represents a side elevational view of the retaining clip, shown in Figure 1.

A tubular housing 14 extends from the inner side of each of the plates 11 and abuts one end of the hub 15 of the lever 16 which is keyed as at 17 to the corresponding shaft 12 or 13. A tubular housing 18 connects the opposed ends of the shafts 12 and 13 and abuts at its ends the remaining ends of the hubs 15. A split collar 19 is disposed around the inner edge portion of each of the housings 14, as shown in Figure 7, (also see Figure 20) and a bolt 20 is employed for securing the free ends thereof together and for clamping the collar around the housing. The intermediate portion of this collar 19 is provided with a thickened construction 21 in which is located the pointed head 22 which bites into the housing 14 in the manner substantially shown in Figures 7 and 20, this head 22 being provided with a threaded shank 23 which extends upwardly and through the corresponding brace members 24—25. A nut 26 secures these brace members to the clamp collar 19 in the manner shown in Figures 7 and 20 and the remaining ends of these brace members are secured by certain of the aforementioned bolts 10. Thus supporting means is afforded for the housings 14. Projecting outwardly from the plates 8 are the barrels, one for each of the plates. These barrels are denoted by numeral 26 and each encases the corresponding end portion of the shaft 12 or 13. Each of these barrels 26 abuts the inner end of the corresponding hub 27 of an arm 28, which is keyed, as at 29, to the corresponding shaft end. Suitable bearing assemblies 30 are located within the barrels 26 and housing sections 14 for the shafts 12 and 13.

As is clearly shown in Figure 15, the levers 16 depend and each is provided with a ball socket 31 at its lower end for receiving the ball 32 of the connector 33, there being a ball head at each end of this connector.

Now referring to the operating means generally referred to by numeral 6, it can be seen that numeral 34 represents a swingable hand lever provided with guide means 35 on one side thereof for the detent rod 36, the same being provided with a spring 37 for normally maintaining the detent head 38 projected downwardly to engage with the seat of the rack 39 which is stationarily mounted with respect to the hand lever 34. As is clearly shown in Figure 14, this rod 36 slides through a member 40 and the adjacent part of the rod 36 is provided with a socket 41 for receiving the bolt 42 of the lock mechanism generally referred to by numeral 43 in Figure 14. This lock mechanism 43 is provided with a key slot 44 through which a key is disposed for operating the bolt 42, which bolt, when projected into the recess 41 in the rod 36 will lock the rod in spring projected position, that is, with the detent head 38 engaging the rack 39. Thus, when the hand lever 34 is in the operative position and the lock has been operated, the ground engaging and gripping means denoted by numeral 5 in Figure 1 will steadfastly remain engaged against the ground so as to prevent the vehicle from being moved.

Extending from the lower end of the hand lever 34 below the fulcrum point 45 is the rod 46 which connects the lower arm of the lever 34 with the intermediate portion of the connector 33 shown in Figure 15.

Figure 2:
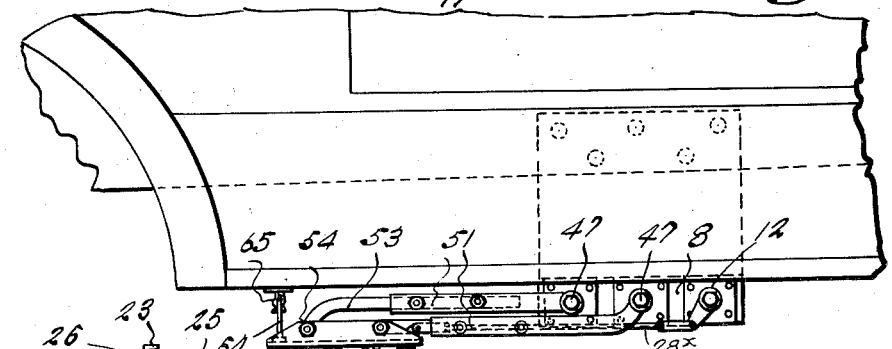
Figure 2 represents a fragmentary side elevational view of an automobile, showing the device in collapsed position.

The arms 28 are connected by pitmen 28x, Figures 1, 2 and 3, with the forward portions of the plates 57 of the ground engaging devices 5.

Therefore, when the hand lever is operated, the connector 34 is pulled and this in turn imparts motion to the levers 16—16 sufficient to operate the shafts 12 and 13 and to swing the ground gripping units 5 to ground engaging position. Furthermore, it will be noted that the structure shown in Figure 5 forms an equalizing means whereby the operation of the devices 5 will be equalized so that both will be engaged uniformly with the ground.

Now referring to the ground engaging devices 5, a description of one unit will suffice for both.

From each plate 8 projects outwardly a pair of spindles 47, each of which is provided with a reduced extension 48 on which the barrel 49 is rotatable, there being bearing assemblies 50 interposed between the reduced extension 48 and the said barrel 49.

Leg sections 51—51 depend from each barrel 49 and each is provided with a slot 52 to accommodate a corresponding post member 53 which is pivotally connected at its lower end, as at 54, to the ground gripping plates shown in Figures 17 and 18. This is accomplished by disposing a tie bolt 55 through the upstanding flanges 56—56 on the plate 57 and disposing this tie bolt through the lower end collars 58 of the corresponding pair of posts 53. As is clearly shown in Figure 9, each of the legs 51 is provided with a pair of openings through which securing elements 60 can be disposed and these securing elements can be disposed through predetermined openings 61 in the posts 53. Therefore, the connections between the plate 57 and the spindles 47 can be adjusted to various distances depending upon the type of car on which the device is to be employed.

The plate 57 is provided with a plurality of threaded openings through which the threaded shanks 62 of pointed calk members 63 are disposed.

Each of the plates 57 is provided with a projection 64, which when the corresponding unit is in collapsed position, engages into the retaining clip 65 for retaining the corresponding unit in elevated position.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination, the longitudinal spaced chassis bars of a wheeled vehicle, plates fixed to and pendent from said chassis bars, barrels fixed to and extending laterally outward from said plates, braces fixed to and extending downwardly and laterally inward from said chassis bars, collars carried by and pendent from the inner ends of said braces and carrying inwardly directed projections, tubular housings transversely alined with said barrels and fixed to and extending laterally inward from said pendent plates and disposed in said collars and having indentures receiving said projections of the collars, transversely-alined shaft sections disposed in said barrels and tubular housings and extending outwardly from the former and inwardly from the latter, a tubular housing mounted on and supported by the inner adjacent portions of said shaft sections, levers having hubs receiving and keyed to said shaft sections and interposed between the last-named tubular housing and the tubular housings fixed to the pendent plates, a rod having end portions rockably bearing in said levers, a lever mounted on the chassis of the vehicle and connected with said rod, spindles fixed to and extending laterally outward from each of said pendent plates on the chassis bars and disposed in rear of said outwardly extending barrel on each plate, ground engaging devices having calked plates, pitmen connecting the arms on the outwardly extending portions of the shaft sections with the forward ends of said plates, and barrels mounted to rock on said spindles, each barrel having a pair of spaced swingable legs thereon pivotally connected at their lower ends with spaced portions of a plate of one of the ground engaging devices, whereby four swingable legs are interposed between each pendent plate and each ground engaging device.

2. In combination, a longitudinal chassis bar of a wheeled vehicle, a ground-engaging device having a calk-bearing plate with upright side flanges and also having forward and rear cross rods secured in said flanges, spindles fixed with respect to and extending laterally relatively to said chassis bar and arranged one in front of the other, barrels rockable about said spindles, forward transversely-spaced legs carried by the forward barrel and pivotally connected at their lower ends to the forward cross-rod of the ground engaging device, rear transversely spaced legs carried by the rear barrel and pivotally connected at their lower ends to the rear cross rod of the ground engaging device.

3. In combination, the longitudinal chassis bar of a wheeled vehicle, barrels fixed to and extending laterally outward relative to said bars, braces fixed to and extending downwardly and laterally inward from said chassis bars, tubular housings transversely aligned with said barrels and fixed with respect to said chassis bar and extending laterally inward relatively thereto and carried by said braces, transversely aligned shaft sections disposed in said barrels and tubular housings and extending outwardly from the former and inwardly from the latter, lever means keyed to said shaft sections, a lever mounted on the chassis of the vehicle and connected with said lever means, spindles fixed with respect to and extending laterally outward relatively to each of said chassis bars and disposed in rear of said outwardly extending barrel complementary to each chassis bar, ground engaging devices, pitmen connecting the arms on the outwardly extending portions of the shaft sections with said ground engaging devices, and barrels mounted to rock on said spindles, each barrel having a pair of spaced swingable legs thereon pivotally connected at their lower ends with one ground-engaging device, whereby four swingable legs are interposed between each chassis bar and each ground engaging device.

FRANK GARIGLIANO.
LERINO LATTANZI.